United States Patent [19]
Holmes et al.

[11] Patent Number: 5,418,101
[45] Date of Patent: May 23, 1995

[54] PHOTOSENSITIVE COMPOSITION FOR USE IN AN OPC COMPRISING X-METAL FREE PHTHOLOCYAMINE AND A DISPERSANT

[75] Inventors: Marie Holmes, Mooreside; Geoffrey R. Rothwell, Chadderton, both of England

[73] Assignee: Zeneca Limited, London, England

[21] Appl. No.: 746

[22] Filed: Jan. 5, 1993

[30] Foreign Application Priority Data

Jan. 10, 1992 [GB] United Kingdom ............... 9200519

[51] Int. Cl.6 ............................................. G03G 5/00
[52] U.S. Cl. ........................................ 430/78; 430/56; 430/57; 430/75; 430/76
[58] Field of Search ................. 430/76, 75, 77, 107, 430/109, 78, 56, 57; 540/122

[56] References Cited

U.S. PATENT DOCUMENTS

| 3,972,718 | 8/1976 | Weigl | 96/1.5 |
| 4,868,086 | 9/1989 | Ohtani et al. | 430/137 |
| 4,921,773 | 5/1990 | Melnyk et al. | 430/132 |

FOREIGN PATENT DOCUMENTS

| 0208041 | 1/1987 | European Pat. Off. | B01F 17/00 |
| 0385440 | 9/1990 | European Pat. Off. | G03G 5/06 |
| WO87/05924 | 10/1987 | WIPO | C09D 17/00 |

OTHER PUBLICATIONS

Japanese Abstract, vol. 13, No. 269 (P-888)(3617) Jun. 21, 1989 and Japanese Abstract, JP-A-10 62 648, Mar. 9, 1989.

*Primary Examiner*—S. Rosasco
*Attorney, Agent, or Firm*—Cushman Darby & Cushman

[57] ABSTRACT

A composition of matter, useful in the production of organic photoconductor devices, comprising a dispersion of X-form metal-free phthalocyanine in an organic liquid containing an effective amount of a dispersant.

19 Claims, No Drawings

PHOTOSENSITIVE COMPOSITION FOR USE IN AN OPC COMPRISING X-METAL FREE PHTHOLOCYAMINE AND A DISPERSANT

COMPOSITION OF MATTER

This invention relates to compositions of matter and more particularly to dispersions of a phthalocyanine in organic solvents and to the use of said dispersions in the preparation of organic photoconductors.

Organic photoconductor (OPC) or photoreceptor devices used in electrophotographic copiers and printers may be of the dual layer or mono layer types. The dual layer type generally comprises an electrically conducting support, a charge generating layer containing a charge generating material, which may be a dye or pigment, and a charge transport layer containing a charge transport material which may be either an n-type or a p-type semi conductor. In the mono layer type, the charge generating material and charge transport material are both present in a single layer.

As examples of pigments particularly useful as charge generating materials, there may be mentioned phthalocyanine compounds, an especially suitable phthalocyanine being the X-form of metal-free phthalocyanine.

The preparation of electrophotographic plates by milling various phthalocyanine pigments with a solution of a resinous binder until a suitable dispersion is obtained and then applying the mix to a supporting substrate is described in U.S. Pat. No. 3816118.

It has now been found that highly stable dispersions of X-form metal-free phthalocyanine in organic solvents may be obtained if the resinous binder is supplemented or entirely replaced by an appropriate dispersant, the dispersions so obtained being suitable for the preparation of OPC devices having charge generating layers of improved quality.

Accordingly, the present invention provides a composition of matter comprising a dispersion of X-form metal-free phthalocyanine in an organic liquid containing an effective amount of a dispersant.

The organic liquid present in the composition of the invention is preferably a polar organic liquid or a substantially non-polar aromatic hydrocarbon or halogenated hydrocarbon. By the term "polar" in relation to the organic liquid is meant an organic liquid capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the above-mentioned article.

Examples of suitable polar organic liquids are ethers, especially lower alkyl ethers, esters, ketones, glycols, alcohols and amides. Numerous specific examples of such moderately and strongly hydrogen bonding liquids are given in the book entitled "Compatibility and Solubility" by Ibert Mellan (published in 1968 by Noyes Development Corporation) in Table 2.14 on pages 39 and 40 and these liquids all fall within the scope of the term "polar organic liquid" as used in this specification.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids, there may be mentioned dialkyl and cycloalkyl ketones, such as acetone, methyl ethyl ketone, diethyl ketone, di-iso-propyl ketone, methyl iso-butyl ketone, di-iso-butyl ketone, methyl iso-amyl ketone, methyl n-amyl ketone and cyclohexanone; alkyl esters such as methyl acetate, ethyl acetate, isopropyl acetate, butyl acetate, ethyl formate, methyl propionate and ethyl butyrate, glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate, alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, and halogenated aliphatic and aromatic hydrocarbons, such as trichloroethylene, perchloroethylene and chlorobenzene.

The dispersant present in the composition of the invention is preferably a poly($C_{2-4}$-alkyleneimine) carrying at least two mono- or poly-(carbonyl-$C_{1-17}$-alkyleneoxy) groups.

Each alkylene group in the carbonyl-$C_{1-17}$-alkyleneoxy group (hereinafter referred to as the "CAO group") or the poly(carbonyl-$C_{1-17}$-alkyleneoxy) group (hereinafter referred to as the "PCAO chain") preferably contains 17 carbon atoms, an especially preferred CAO group being 11-oxyheptadecamethylene-1-carbonyl (which may optionally contain one carbon-carbon double bond), or from 3 to 6 carbon atoms, an especially preferred alkylene group being pentamethylene wherein the CAO group is 5-oxypentamethylene-1-carbonyl (hereinafter referred to as "OPMC") which is derived from E-caprolactone. The PCAO chain may contain a mixture of alkylene groups of different length but is preferably a homopolymer, especially of OPMC. The PCAO chain or the CAO group may carry a chain-stopping terminal group at the free end, such as optionally substituted alkyl carbonyl, e.g. alkyl carbonyl, alkoxyalkyl carbonyl or haloalkyl carbonyl, where the absence of a terminal hydroxy group prevents formation or further growth of the PCAO chain. The PCAO chain preferably contains from 2 to 100, and more preferably from 3 to 80, CAO groups.

The CAO group and PCAO chain can be conveniently represented by the general formula:

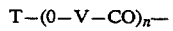

$$T-(O-V-CO)_n- \qquad \text{I}$$

wherein

T is H or RCO— in which R represents alkyl, alkoxyalkyl or haloalkyl;

V is a $C_{1-17}$-alkylene group;

and n is a number from 1 to 100.

When n=1, Formula I represents a CAO group and when n>1, Formula I represents a PCAO chain.

Each CAO group of PCAO chain is preferably linked to the poly($C_{2-4}$-alkyleneimine) (hereinafter referred to as "PAI") through a covalent "amide" link,

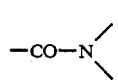

formed between a terminal carbonyl group (—CO—) of the CAO group or PCAO chain and the nitrogen atom (N) of a primary of secondary amino group in the PAI, or through an ionic "salt" link,

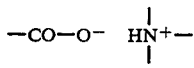 III between a terminal carboxylate group (—CO—O⁻) of the CAO group or the PCAO chain and the positively charged nitrogen atom (+N) of a substituted ammonium group in the PAI. Because the dispersant contains at least two CAO groups or PCAO chains it may contain a mixture of amide and salt links depending upon the severity of the conditions under which it is prepared.

The dispersant can be conveniently represented by the following general formula:

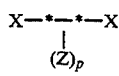 IV wherein
X—*—*—X represents a poly($C_{2-4}$-alkylene)imine (PAI);
Z represents a CAO group or PCAO chain linked to the PAI through an amide or salt link; and
p is a number from 2 to 10000.

The dispersant preferably contains from 4 to 2000 (p=4 to 2000) and more preferably from 4 to 1000 (p=4 to 1000) CAO groups or PCAO chains.

The PAI is preferably a poly(ethyleneimine), hereinafter referred to as "PEI", which may be branched or straight-chained. A preferred dispersant comprises PEI carrying at least two CAO groups or PCAO chains attached thereto by amide and/or salt links. The PAI preferably has a weight-average molecular weight from 500 to 600,000 and more preferably from 1,000 to 200,000.

The dispersant may be derived from a PAI and a CAO acid, a CAO lactone or a PCAO acid, i.e. a compound of the formula:

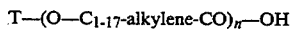 V in which T and n are as defined above. The length of the PCAO chain in the PCAO acid may be controlled by the presence of chain stopper, such as a carboxylic acid free from hydroxy groups, in the preparative process. Where the dispersant carries PCAO chains formed by a polymerisation of a carbonylalkyleneoxy monomer, such as a lactone, in the presence of the PAI, there is less need for a chain stopper, because the PCAO chains grow on the PAI and cannot react together; in such a case the pendant PCAO chains may be terminated by hydroxy groups.

The dispersant may be derived from a PAI having at least two primary, secondary or tertiary amino groups, and a CAO or PCAO acid, in which case reaction between a p-, s- or t-amino group in the PAI and a terminal carboxyl group on the CAO or PCAO acid forms an amide or salt link. If the PAI contains a t-amino group, only salt links can be formed, otherwise salt and/or amide links are formed depending on the reaction conditions. Generally, mild reaction conditions such as low temperatures and/or short reaction times promote the formation of salt links and more severe conditions, such as high temperatures and/or long reaction times promote the formation of amide links in a manner which is familiar to the skilled chemist.

The above mentioned dispersants may be obtained by the methods described in our EP-A-208041.

It may be advantageous for dispersion stability and for the electrical properties of the derived OPC devices if the dispersion also contains a fluidising agent. Suitable fluidising agents, some of which are described in our GB 1508576, include compounds of the formula:

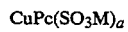 VI wherein CuPc represents a copper phthalocyanine nucleus,
a is an integer from 1 to 3, and
each M, independently, represents a hydrogen ion or an optionally substituted ammonium ion in which any substituents are selected from optionally substituted alkyl, optionally substituted aryl and optionally substituted aralkyl.

A preferred fluidising agent is a copper phthalocyanine sulphonic acid containing, on average, from 1 to 2 sulphonic acid groups. Even more preferred fluidising agents are substituted ammonium salts of said acids.

The dispersions of the invention suitably contain from 0.5 to 30%, preferably from 2 to 10% by weight of X-form metal-free phthalocyanine, the dispersant being present in an amount of from 2 to 50%, preferably from 2 to 25% and more preferably from 2 to 10% by weight based on the weight of the phthalocyanine. When a fluidising agent is present, suitable amounts are from 0.5 to 10%, preferably from 0.5 to 5% and more preferably from 0.5 to 2% by weight based on the weight of the phthalocyanine.

Conventional methods, for example conventional milling methods, may be used to prepare the dispersions of the invention which may also contain a resinous binder.

The compositions of the invention are useful in the production of the charge generating layers of dual layer OPC devices and may be used in conventional manner to produce such devices. In a typical procedure, a composition of the invention is applied to an electrically conducting support which may be a metal support, preferably in the form of a drum, or a composite material comprising an insulating supporting material such as a sheet of polymeric material, for example a polyester sheet or film, coated with a thin film of conducting material, for example a metal such as aluminium, in the form of a drum or a continuous belt. An adhesion layer will preferably have been applied to the electrically conducting support before application of the charge generating layer. Suitable adhesion layers comprise an adhesive resin, for example a vinyl polymer such as VMCA (available from Union Carbide) which may be applied in a solvent such as methyl ethyl ketone.

Application of the compositions of the invention to the electrically conducting support is preferably effected by dip coating but any other coating method may be used, for example spray coating, flow coating, knife coating, electro-coating and the like.

The charge transport layer may be applied over the charge generating layer using conventional methods and may contain conventional charge transport materials for example a leuco di- or tri-arylmethane, a hydrazone, a tetra-aryl benzidine or a triarylamine.

In an alternative procedure, tile charge transport layer is applied to the electrically conducting support and a composition of the invention is subsequently applied to provide a charge generating layer over said charge transport layer.

The compositions of the invention may also be used in the production of combined charge generating/charge transport layers for mono layer type OPC devices.

The invention is illustrated but not limited by the following Examples.

EXAMPLE 1

(a) Adhesion Layer Solution 0.4 g of a polyester resin, Vitel PE200 (a product of Goodyear), were dissolved in 10 ml of a methyl ethyl ketone/toluene mixed solvent (4 vols of MEK to 1 vol. of toluene) and bottled.

(b) Charge Generating Layer Dispersion 0.045 g of Dispersant 1 and 0.009 g of a fluidising agent were added to a 120 g bottle containing 20 ml of methyl ethyl ketone and 50 g of 3 mm glass beads and then shaken for 30 minutes on a Red Devil mill to dissolve. After shaking, 0.9 g of X-form metal-free phthalocyanine were added to the bottle and further milled for 60 minutes on the Red Devil mill. On completion of the milling, a further 20 ml of methyl ethyl ketone were added to the dispersion.

Dispersant 1 is a condensation copolymer of polycaprolactone and polyethyleneimine obtained by reacting 97.3 g of polycaprolactone with 7.48 g of a dry polyethyleneimine (having a weight average molecular weight in the region of 100,000) by stirring under nitrogen for 8 hours at 120° C. The polycaprolactone was made by stirring a mixture of 500 g of E-caprolactone, 73 g of lauric acid and 0.5 g of tetrabutyl titanate under nitrogen for 20 hours at 170°-180° C., the product having an acid value of 36.3 mg KOH/g and containing, on average, 11.8 oxypentamethylenecarbonyl groups.

The fluidising agent used in this Example is the dioctadecyl dimethylammonium salt of a copper phthalocyanine sulphonic acid containing, on average, 1.3 sulphonic acid groups per molecule.

(c) Charge Transport Layer Solution

A polycarbonate, Lexan 161-111 (a product of General Electric Plastics), solution was prepared by dissolving 19.6 g of the polymer in 180 ml of a dichloromethane/toluene solvent (9 vols of DCM: 1 vol toluene).

6.0 g of a commercially available hydrazone, p-diethylaminobenzaldehyde-1,1-diphenylhydrazone, were dissolved in 69.2 ml of the above mentioned polycarbonate solution to prepare the charge transport material solution.

The above mentioned solutions and dispersion were then sequentially bar coated onto a sample (8×34 cm) of 100 micron thick aluminised polyester (a product of Flex Products, Santa Rosa, USA) fitted into a mechanised bar coater (R.K. Coater type K202) as follows:

(a) the adhesion layer solution was applied to the aluminised surface of the polyester using a K1 wire wound bar (6 micron thick wet coat) and dried using an industrial hand held air drier (Costech), (b) the charge generating material dispersion was applied to the above coating using a K1 wire wound bar and dried using an air drier, (c) the charge transport solution was finally applied using a K5 (50 micron thick wet coat) and a K8 wire wound bar (100 micron thick wet coat) and dried using an air drier. The completed OPC sheet was further dried at 90° C. for 1 hour in an electrically heated oven.

The photoelectrical properties of the OPC sheet were measured using a Kawaguchi Electrostatic Paper Analyser Model SP-428 constructed by the Kawaguchi Electric Company, Japan.

EXAMPLE 2

As Example 1 but the adhesion layer polymer was a Union Carbide (UCAR) solution vinyl resin VYLF, which is a copolymer of vinyl chloride and vinyl acetate.

EXAMPLE 3

As Example 1 but the adhesion layer polymer was a Union Carbide (UCAR) solution vinyl resin VAGD, which is a hydroxyl modified vinyl chloride—vinyl acetate copolymer.

EXAMPLE 4

The procedure described in Example 1 was repeated with the sole exception that the 20 ml of methyl ethyl ketone used in preparing the charge generating layer dispersion was replaced by 20 ml of a 4:1 (by volume) mixture of methyl ethyl ketone and toluene.

EXAMPLE 5

The procedure described in Example 1 was repeated with the sole exception that the 20 ml of methyl ethyl ketone used in preparing the charge generating layer dispersion was replaced by 20 ml of methyl isobutyl ketone.

EXAMPLE 6

The procedure described in Example 1 was repeated with the sole exception that the 20 ml of methyl ethyl ketone used in preparing the charge generating layer dispersion was replaced by 20 ml of ethyl acetate.

EXAMPLE 7

The procedure described in Example 1 was repeated with the sole exception that the 20 ml of methyl ethyl ketone used in preparing the charge generating layer dispersion was replaced by 20 ml of n-butyl acetate.

EXAMPLE 8

The procedure described in Example 1 was repeated with the sole exception that the 20 ml of methyl ethyl ketone used in preparing the charge generating layer dispersion was replaced by 20 ml of toluene.

EXAMPLE 9

The procedure described in Example 1 was repeated except that the combination of 0.045 g of Dispersant 1 and 0.009 g of fluidising agent used in preparing the charge generating layer dispersion was replaced by 0.09 g of Dispersant 1 and that the 20 ml of methyl ethyl ketone, also used in preparing the dispersion, was replaced by 20 ml of a 4:1 (by volume) mixture of methyl ethyl ketone and toluene.

EXAMPLE 10

The procedure described in Example 9 was repeated except that the 0.09 g of Dispersant 1 was replaced by 0.225 g of Dispersant 2.

Dispersant 2 is a 40% by weight solution in toluene of a condensation copolymer made by reacting 3 parts by weight of poly(12-hydroxystearic acid) having an acid value of 33 mg KOH/g with 1 part by weight of a dry polyethyleneimine having a weight-average molecular weight in the region of 100,000.

Typical photoelectrical results for the OPC sheets prepared in Examples 1–10 are shown in the following Table:

| Example Number | Initial Voltage | Voltage Reduction Dark | % Dark Decay | Sensitivity | Residual Potential |
|---|---|---|---|---|---|
| 1 | 820 | 500 | 39.0 | 1.0 | 40 |
| 2 | 870 | 520 | 40.2 | 0.9 | 40 |
| 3 | 940 | 540 | 42.6 | 0.8 | 20 |
| 4 | 590 | 280 | 52.5 | 1.1 | 0 |
| 5 | 640 | 360 | 43.8 | 1.4 | 0 |
| 6 | 840 | 520 | 38.1 | 1.5 | 30 |
| 7 | 880 | 550 | 37.5 | 1.6 | 40 |
| 8 | 900 | 590 | 34.4 | 1.5 | 30 |
| 9 | 860 | 610 | 29.1 | 1.3 | 50 |
| 10 | 930 | 690 | 25.8 | 1.5 | 20 |

We claim:

1. A stable dispersion for OPC devices comprising 0.5 to 30% by weight X-form metal-free phthalocyanine in an organic liquid and 2 to 50% based on weight of phthalocyanine of a dispersant comprising a poly ($C_{2-4}$-alkyleneimine) carrying at least two mono- or poly-(carbonyl-$C_{1-17}$-alkyleneoxy) groups.

2. A dispersion according to claim 1 wherein the organic liquid comprises a polar organic liquid selected from ethers, esters, ketones, glycols, alcohols and amides.

3. A dispersion according to claim 2 wherein the polar organic liquid is selected from dialkyl ketones, alkyl esters of alkane carboxylic acids and alkanols.

4. A dispersion according to claim 1 wherein the organic liquid comprises a substantially non-polar aromatic hydrocarbon or halogenated hydrocarbon.

5. A dispersion according to claim 4 wherein the aromatic hydrocarbon is toluene or xylene.

6. A dispersion according to claim 1 wherein the alkylene groups in the mono- or poly-(carbonyl-$C_{1-17}$-alkyleneoxy) groups contain 17 carbon atoms.

7. A dispersion according to claim 1 wherein the alkylene groups in the mono- or poly-(carbonyl-$C_{1-17}$-alkyelenoxy) groups contain from 3 to 6 carbon atoms.

8. A dispersion according to claim 7 wherein the alkylene groups are pentamethylene groups.

9. A dispersion according to any claim 1 wherein the poly(carbonylalkyleneoxy) groups contain from 2 to 100 carbonylalkyleneoxy units.

10. A dispersion according to any claim 1 wherein the poly($C_{2-4}$-alkyleneimine) is a polyethyleneimine having a weight-average molecular weight from 500 to 600,000.

11. A dispersion according to claim 1 containing from 2 to 25% by weight of dispersant based on the weight of the phthalocyanine.

12. A dispersion according to claim 1 containing from 2 to 10% by weight of dispersant based on the weight of the phthalocyanine.

13. A dispersion as claimed in claim 1 which additionally contains a fluidising agent of formula $$CuPc(SO_3M)_a$$

wherein
CuPc represents a copper phthalocyanine nucleus;
a is an integer from 1 to 3; and
each M, independently, represents a hydrogen ion or an optionally substituted ammonium ion in which the substituents are selected from optionally substituted alkyl, optionally substituted aryl and optionally substituted aralkyl.

14. A dispersion as claimed in claim 13 where the fluidising agent is the dioctadecyldimethylammonium salt of copper phthalocyanine containing on average 1.3 sulphonic acid groups per molecule.

15. A dispersion as claimed in claim 1 which additionally contains a charge transport material selected from the group consisting of leuco di- and tri-arylmethanes, hydrazones, tetraarylbenzidines and triarylmethanes.

16. A dispersion according to claim 1 wherein the dispersant is obtainable by reacting 13 parts of polycaprolactone with 1 part by weight polyethyleneimine having a MW of about 100,000.

17. A dispersion as claimed in claim 1 wherein the dispersant is obtainable by reacting 3 parts by weight poly(12-hydroxystearic acid) with 1 part by weight polyethyleneimine having a MW of about 100,000.

18. A dispersion as claimed in claim 1 which further comprises a binder resin.

19. An OPC device having a charge generation layer comprising 0.5 to 30% by weight X-form metal-free phthalocyanine and 2 to 50% based on weight of phthalocyanine of a dispersant comprising a poly($C_{2-4}$-alkyleneimine) carrying at least two mono- or poly-(carbonyl-$C_{1-17}$-alkyleneoxy) groups.

* * * * *